(12) United States Patent
Wright

(10) Patent No.: US 11,985,225 B2
(45) Date of Patent: May 14, 2024

(54) COMPUTER-IMPLEMENTED SYSTEMS AND METHODS FOR USING VEILED VALUES IN BLOCKCHAIN

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 403 days.

(21) Appl. No.: 17/055,471

(22) PCT Filed: May 8, 2019

(86) PCT No.: PCT/IB2019/053771
§ 371 (c)(1),
(2) Date: Nov. 13, 2020

(87) PCT Pub. No.: WO2019/220270
PCT Pub. Date: Nov. 21, 2019

(65) Prior Publication Data
US 2021/0226787 A1 Jul. 22, 2021

(30) Foreign Application Priority Data

May 14, 2018 (GB) ..................................... 1807807
May 14, 2018 (GB) ..................................... 1807811
(Continued)

(51) Int. Cl.
*H04L 9/06* (2006.01)
*H04L 9/08* (2006.01)
(Continued)

(52) U.S. Cl.
CPC .......... *H04L 9/0643* (2013.01); *H04L 9/0618* (2013.01); *H04L 9/0656* (2013.01);
(Continued)

(58) Field of Classification Search
CPC ... H04L 9/0643; H04L 9/0618; H04L 9/0656; H04L 9/0819; H04L 9/085; H04L 9/14;
(Continued)

(56) References Cited

U.S. PATENT DOCUMENTS 6,430,690 B1   8/2002   Vanstone et al.
6,834,272 B1   12/2004  Naor et al.
(Continued)

FOREIGN PATENT DOCUMENTS

CN   101860643 A   10/2010
CN   101957898 A   1/2011
(Continued)

OTHER PUBLICATIONS

Andrychowicz et al., "Fair Two-Party Computations via Bircoin Deposits," International Conference on Financial Cryptography and Data Security, 2014, 15 pages.
(Continued)

*Primary Examiner* — Bryan F Wright
(74) *Attorney, Agent, or Firm* — Davis Wright Tremaine LLP

(57) ABSTRACT

A computer-implemented exchange method is provided. The method may be performed on one or more blockchains, such as the Bitcoin Cash blockchain. The method comprises the steps of: communicating a first veiled secret value (H(A0)) from a first user to a second user and a second veiled secret value (H(B0) from the second user to the first user; and constructing first and second blockchain transactions (tx1, tx2) each comprising the first veiled secret value and the second veiled secret value, the transactions arranged to be unlockable to transfer control of a respective first or second resource upon provision of both the first secret value (A0) and the second secret value (B0) to the respective blockchain transaction, wherein unlocking of the first blockchain
(Continued)

transaction causes a first secret value to be revealed to the second user, and unlocking of the second blockchain transaction causes a second secret value to be revealed to the first user.

20 Claims, 5 Drawing Sheets

(30) Foreign Application Priority Data

| | | |
|---|---|---|
| May 14, 2018 | (GB) | 1807813 |
| May 14, 2018 | (GB) | 1807816 |
| May 14, 2018 | (WO) | PCT/IB2018/053346 |
| May 14, 2018 | (WO) | PCT/IB2018/053347 |
| May 14, 2018 | (WO) | PCT/IB2018/053349 |
| May 14, 2018 | (WO) | PCT/IB2018/053350 |

(51) Int. Cl.
  *H04L 9/14* (2006.01)
  *H04L 9/30* (2006.01)
  *H04L 9/32* (2006.01)
  *H04L 9/00* (2022.01)

(52) U.S. Cl.
  CPC ............ *H04L 9/0819* (2013.01); *H04L 9/085* (2013.01); *H04L 9/14* (2013.01); *H04L 9/30* (2013.01); *H04L 9/3213* (2013.01); *H04L 9/3239* (2013.01); *H04L 9/3297* (2013.01); *H04L 9/50* (2022.05)

(58) Field of Classification Search
  CPC ....... H04L 9/30; H04L 9/3213; H04L 9/3239; H04L 9/3297; H04L 9/50; H04L 9/3236
  USPC ......................................................... 713/171
  See application file for complete search history.

(56) References Cited

U.S. PATENT DOCUMENTS

| | | |
|---|---|---|
| 7,152,158 B2 | 12/2006 | Watanabe et al. |
| 7,346,162 B2 | 3/2008 | Slavin |
| 7,490,069 B2 | 2/2009 | Camenisch |
| 9,813,392 B2 | 11/2017 | Lorenz et al. |
| 10,050,779 B2 | 8/2018 | Alness et al. |
| 10,114,963 B1 | 10/2018 | Griffin et al. |
| 11,271,736 B2 | 3/2022 | Allen |
| 11,308,486 B2 | 4/2022 | Wright et al. |
| 11,416,832 B2 | 8/2022 | Gamaroff et al. |
| 11,429,956 B2 | 8/2022 | Bartolucci et al. |
| 11,463,260 B2 | 10/2022 | Chan |
| 11,483,338 B2 | 10/2022 | Jimenez-Delgado |
| 2005/0018852 A1 | 1/2005 | Camenisch et al. |
| 2006/0179073 A1 | 8/2006 | Kimura |
| 2007/0055880 A1 | 3/2007 | Lauter et al. |
| 2013/0145447 A1 | 6/2013 | Maron |
| 2014/0075199 A1 | 3/2014 | Hiwatari et al. |
| 2015/0201028 A1 | 7/2015 | Hinnegan et al. |
| 2015/0213433 A1 | 7/2015 | Khan |
| 2016/0330034 A1* | 11/2016 | Back ............... G06Q 20/065 |
| 2017/0046709 A1 | 2/2017 | Lee et al. |
| 2017/0207917 A1 | 7/2017 | Davis |
| 2017/0214522 A1 | 7/2017 | Code et al. |
| 2017/0293912 A1* | 10/2017 | Furche ............. G06Q 20/3825 |
| 2018/0144114 A1 | 5/2018 | Fiske |
| 2018/0183602 A1 | 6/2018 | Campagna et al. |
| 2018/0204423 A1 | 7/2018 | Mizuno et al. |
| 2018/0218166 A1 | 8/2018 | Cachin et al. |
| 2018/0276626 A1 | 9/2018 | Laiben |
| 2018/0278417 A1 | 9/2018 | Choi et al. |
| 2018/0365686 A1 | 12/2018 | Kondo |
| 2019/0014100 A1 | 1/2019 | Scott et al. |
| 2019/0163883 A1 | 5/2019 | Savanah et al. |
| 2019/0197532 A1 | 6/2019 | Jayachandran et al. |
| 2019/0303623 A1 | 10/2019 | Reddy et al. |
| 2019/0303887 A1 | 10/2019 | Wright et al. |
| 2019/0327218 A1 | 10/2019 | Altenhofen et al. |
| 2020/0137082 A1 | 4/2020 | Jimenez-Delgado |
| 2020/0193432 A1 | 6/2020 | Millar et al. |
| 2021/0203481 A1 | 7/2021 | Wright |
| 2022/0410017 A1 | 12/2022 | Davies et al. |

FOREIGN PATENT DOCUMENTS

| | | |
|---|---|---|
| CN | 108009830 A | 5/2018 |
| CN | 108664221 A | 10/2018 |
| EP | 1912376 A1 | 4/2008 |
| EP | 2003813 A1 | 12/2008 |
| EP | 3439233 A1 | 2/2019 |
| JP | 2002297548 A | 10/2002 |
| JP | 2005033640 A | 2/2005 |
| JP | 2006186903 A | 7/2006 |
| JP | 2008113426 A | 5/2008 |
| JP | 2020520152 A | 7/2020 |
| JP | 2022549070 A | 11/2022 |
| KR | 20040019766 A | 3/2004 |
| KR | 100529594 B1 | 1/2006 |
| KR | 100563515 B1 | 3/2006 |
| TW | 201724803 A | 7/2017 |
| WO | 0176298 A1 | 10/2001 |
| WO | 2004064312 A1 | 7/2004 |
| WO | 2004082207 A1 | 9/2004 |
| WO | 2005024606 A1 | 3/2005 |
| WO | 2012017612 A1 | 2/2012 |
| WO | 2016202952 A1 | 12/2016 |
| WO | 2017079652 A1 | 5/2017 |
| WO | 2017145010 A1 | 8/2017 |
| WO | 2017145021 A1 | 8/2017 |
| WO | 2017178955 A1 | 10/2017 |
| WO | 2017180382 A1 | 10/2017 |
| WO | 2017182601 A1 | 10/2017 |
| WO | 2017191472 A1 | 11/2017 |
| WO | 2018020369 A1 | 2/2018 |
| WO | WO2018020370 | 2/2018 |

OTHER PUBLICATIONS

Antonopoulos, "Mastering Bitcoin—Unlocking Digital Cryptocurrencies," O'Reilly Media, Inc., Dec. 20, 2014, 282 pages.

Asokan et al., "Server-Supported Signatures," Proceedings of the European Symposium on Research in Computersecurity, Sep. 1, 1996, 7 pages.

Bennink et al., "An Analysis of Atomic Swaps on and Between Ethereum Blockchains using Smart Contracts," Technical Report, 2018, 26 pages.

Bguyen et al. "Digital Coins Based on Hash Chain," 1997, 8 pages.

Bitcoin Forum, "[ANN][SDC] ShadowCoin |ShadowChat [EM] | ShadowSend [Anon] | ShadowGo [Mobile]," retrieved from https://bitcointalk.org/index.php?topic=700087.msg8153845, Aug. 2, 2014, 6 pages.

Bowe et al., "Hashed Timelocked Contract Transactions," retrieved fromhttps://github.com/bitcoin/bips/blob/master/pip-0199.mediawiki, Sep. 5, 2017, 2 pages.

Bytecoin, " Untraceable Transactions Which Can Contain a Secure Message are Inevitable," retrieved from https://bitcointalk.org/index.php?topic=5965.0, Apr. 17, 2011, 4 pages.

Courtois et al. "Stealth Address and Key Management Techniques in Blockchain Systems," retrieved from http://www.scitepress.org/Papers/2017/62700/62700.pdf, 2017, 8 pages.

Cross, "Bitcoin/BIPS," retrieved from https://github.com/bitcoin/bips/blob/master/bip-0199.mediawiki, Sep. 5, 2017, 4 pages.

Crosschain, "Decred Cross-Chain Atomic Swapping," retrieved from https://github.com/decred/atomicswap/blob/46df8ffd9f19658101b17326bb87fb4ae1e7e77b/README.md, Apr. 16, 2018, 8 pages.

Crosschain, "Cross-Chain Bitcoin & Monero Atomic Swap," retrieved from https://github.com/GuggerJoel/XMR-BTCatomic/blob/44568f3563205a09228ceb321e9327eb9bde61e2/README.md, Dec. 30, 2017, 3 pages.

(56) References Cited

OTHER PUBLICATIONS

Gugger, "Cross-chain Bitcoin & Monero Atomic Swap," retrieved from https://github.com/GuggerJoel/XMR-BTCatomic/blob/44568f3563205a09228ceb321e9327eb9bde61e2/README.md, Dec. 30, 2017, 3 pages.

Herlihy, "Atomic Cross-Chain Swaps," May 18, 2018, 10 pages.

International Search Report and Written Opinion for Application No. PCT/IB2018/053346, dated Jan. 21, 2019, filed May 14, 2018, 11 pages.

International Search Report and Written Opinion for Application No. PCT/IB2018/053347, dated Feb. 4, 2019, filed May 14, 2018, 12 pages.

International Search Report and Written Opinion for Application No. PCT/IB2018/053349, dated Jan. 21, 2019, filed May 14, 2018, 11 pages.

International Search Report and Written Opinion for Application No. PCT/IB2019/053771, dated Jul. 15, 2019, filed May 8, 2019, 11 pages.

International Search Report and Written Opinion for Application No. PCT/IB2019/053944, dated Jul. 19, 2019, filed May 13, 2019, 12 pages.

International Search Report and Written Opinion for Application No. PCT/IB2019/053945, dated Jul. 19, 2019, filed May 13, 2019, 12 pages.

Otex, "Blockchain Privacy-Enhancing Technology Series—Stealth Address (I)," retirved from https://hackernoon.com/blockchain-privacy-enhancing-technology-series-stealth-address-ic8a3eb4e4e43, May 15, 2018, 7 pages.

Kirsten et al., "Anonymous Atomic Swaps Using Homomorphic Hashing," retrieved from https://papers.ssrn.com/sol3/papers.cfm?abstract_id=3235955, Aug. 30, 2018, 8 pages.

Lamport et al., "Password Authentication with Insecure Communication," Communications of the ACM, 24(11): Nov. 1, 1981, 3 pages.

Lamport, "Constructing Digital Signatures from a One Way Function," retrieved from https://www.microsoft.com/en-us/research/uploads/prod/2016/12/Constructing-Digital-Signatures-from-a-One-Way-Function.pdf, Oct. 18, 1979, 8 pages.

Mazonka et al., "Hasq Hash Chains," Hasq Technology Pty Ltd, 2014, 5 pages.

Nakamoto, "Bitcoin: A Peer-to-Peer Electronic Cash System," Bitcoin, Oct. 31, 2008, https://bitcoin.org/bitcoin.pdf, 9 pages.

Nguyen et al., "Digital Coins Based on Hash Chain," retrieved from https://pdfs.semanticscholar.org/a7b5/71ed5b601ac1f0c00f5c5773b88ed1e7fe75.pdf, Oct. 2017, 8 pages.

Rivest et al., "PayWord and MicroMint: Two Simple Micropayment Schemes," MIT Laboratory for Computer Science, Apr. 27, 2001, 19 pages.

Saberhagen, "CryptoNote v 2.0," retrieved from https://cryptonote.org/whitepaper.pdf, Oct. 17, 2013, 20 pages.

Satoshi et al., "Connection Limits," Bitcoin Forum, Aug. 9, 2010, https://bitcointalk.org/index.php?topic=741.0;brev_next=prev, 2 pages.

Shamir et al., "PayWord and MicroMint: Two Simple Micropayment Schemes," retrieved from https://people.csail.mit.edu/rivest/RivestShamir-mpay.pdf, Apr. 27, 2001, 19 pages.

Skowronski, "Fully Distributed GRIDNET Protocol, with No Trusted Authorities," International Conference on Information Networking, Jan. 11, 2017, 6 pages.

Stealth, "Blockchain Privacy-Enhancing Technology Series-Stealth Address (I)," retrieved from https://hackernoon.com/blockchain-privacy-enhancing-technology-series-stealth-address-ic8a3eb4e4e43, May 15, 2018, 7 pages.

"Stone, Hash Chain Tokenization Criticism," retrieved from https://www.yours.org/content/hash-chain-tokenization-criticism-e2b0ae5a5abf, Dec. 31, 2018, 1 page.

UK Commercial Search Report dated Jan. 4, 2019, Patent Application No. GB1807807.1, 10 pages.

UK Commercial Search Report dated Jan. 4, 2019, Patent Application No. GB1807811.3, 11 pages.

UK Commercial Search Report dated Jan. 4, 2019, Patent Application No. GB1807813.9, 10 pages.

UK Commercial Search Report dated Jan. 4, 2019, Patent Application No. GB1807816.2, 10 pages.

Uk Ipo Search Report dated Nov. 13, 2018, Patent Application No. GB1807807.1, 8 pages.

Uk Ipo Search Report dated Nov. 13, 2018, Patent Application No. GB1807811.3, 8 pages.

Uk Ipo Search Report dated Nov. 14, 2018, Patent Application No. GB1807813.9, 7 pages.

Uk IPO Search Report dated Nov. 14, 2018, Patent Application No. GB1807816.2, 7 pages.

Van Saberhagen, "CryptoNote v 2.0," Oct. 17, 2013, https://bytecoin.org/old/whitepaper.pdf, 20 pages.

Wikipedia, "Hash Chain," retrieved from https://en.wikipedia.org/w/index.php?title=Hash_chain&oldid=755636747, Dec. 19, 2016, 3 pages.

Watanabe et al., "Blockchain Contract: A Complete Consensus Using Blockchain," Conference Paper, 2015, 3 pages.

Crypto Reporter, "Waltonchain Review: RFID and Blockchain for Supply Chain Management", https://t.me/crypto_reporter, Jan. 23, 2018, 16 pages.

* cited by examiner

COMPUTER-IMPLEMENTED SYSTEMS AND METHODS FOR USING VEILED VALUES IN BLOCKCHAIN

CROSS REFERENCE TO RELATED APPLICATIONS

This application is a 371 Nationalization of International Patent Application No. PCT/IB2019/053771, filed May 8, 2019, entitled "COMPUTER-IMPLEMENTED SYSTEMS AND METHODS FOR USING A BLOCKCHAIN TO PERFORM AN ATOMIC SWAP," which claims priority to United Kingdom Patent Application No. 1807807.1, filed May 14, 2018, entitled "COMPUTER-IMPLEMENTED SYSTEM AND METHOD," United Kingdom Patent Application No. 1807811.3, filed May 14, 2018, entitled "COMPUTER-IMPLEMENTED SYSTEM AND METHOD," United Kingdom Patent Application No. 1807813.9, filed May 14, 2018, entitled "COMPUTER-IMPLEMENTED SYSTEM AND METHOD," United Kingdom Patent Application No. 1807816.2, filed May 14, 2018, entitled "COMPUTER-IMPLEMENTED SYSTEM AND METHOD," International Patent Application No. PCT/IB2018/053346, filed May 14, 2018, entitled "COMPUTER-IMPLEMENTED SYSTEM AND METHOD," International Patent Application No. PCT/IB2018/053347, filed May 14, 2018, entitled "COMPUTER-IMPLEMENTED SYSTEM AND METHOD," International Patent Application No. PCT/IB2018/053349, filed May 14, 2018, entitled "COMPUTER-IMPLEMENTED SYSTEM AND METHOD," and International Patent Application No. PCT/IB2018/053350, filed May 14, 2018, entitled "COMPUTER-IMPLEMENTED SYSTEM AND METHOD," the disclosures of which are incorporated herein by reference in their entirety.

This invention relates generally to a computer-implemented security method, and cryptographic techniques. More particularly, it relates to a method for atomically exchanging the control of resources. The invention is particularly suited, but not limited, to use on one or more blockchains and associated protocols.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource. Also, the term "Bitcoin" as used herein is intended to include all version and variations of protocol or implementation deriving from the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset or resource between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

The concept of an atomic swap has previously been discussed in the cryptocurrency community. The exchange between the parties is "atomic" in the sense that all participants receive their desired resource (e.g. cryptocurrency token or coin) or none do. At the time of writing, Wikipedia describes an atomic swap as "a proposed feature in cryptocurrencies that allows for the exchange of one cryptocurrency for another cryptocurrency without the need for a trusted third party. In traditional cryptocurrencies a trusted third party such as a cryptocurrency exchange is necessary to perform a swap of cryptocurrencies in order to prevent one party from sending a currency without receiving a currency in return. An atomic swap system uses a hash time-locked smart contract so that a party must deliver the currency to be swapped within a specified time, or else the transaction will be cancelled. This preserves atomicity in that either the swap will take place, or no currency will be swapped"—https://en.wikipedia.org/wiki/Atomic_swap.

Thus, atomic swaps offer enhanced security in respect of transfers conducted over a blockchain, because removal of the need for a trusted third party removes the risk of exploits and malicious interventions—a number of security breaches or "hacks" have been performed in respect of cryptocurrency exchanges such as Mount Gox.

However, proposed atomic swap solutions involve the use of only one secret, and the swap is performed asynchronously. This creates the disadvantage that one transaction has to be spent before the other can be spent.

Thus, it is desirable to provide a cryptographically-enforced resource exchange method of atomically exchanging resources or assets having the trustlessness and immutability provided by blockchain technology, and which enhances security in respect of transfers conducted over blockchain-implemented networks.

Such an improved solution has now been devised.

According to the present invention, there is provided a computer-implemented exchange, interchange or transfer method. According to an additional or alternative definition, the invention provides a security method which controls when a resource may or may not be transmitted across the network from a sender to a recipient. Additionally or alternatively, the invention provides a method and corresponding system arranged to perform an atomic exchange or transmission of resources via a blockchain.

The method may comprise the steps of:
(i) communicating a first veiled secret value from a first user to a second user and a second veiled secret value from the second user to the first user; and
(ii) constructing first and second blockchain transactions each comprising the first veiled secret value and the second veiled secret value, the transactions arranged to be unlockable to transfer control of a respective first or second resource upon provision of both a first secret value and a second secret value to the respective blockchain transaction,
wherein unlocking of the first blockchain transaction causes the first secret value to be revealed to the second user, and unlocking of the second blockchain transaction causes the second secret value to be revealed to the first user.

The method may provide an atomic exchange mechanism by comprising at least two transactions (Tx1 and Tx2), each transaction having at least one unspent output (UTXO) which can only be unlocked upon provision of the required criteria to a plurality of puzzles or scripts associated with the respective output. In other words, the locking and unlocking criteria for an unspent output in the first transaction may be the same as, and mirrored by, the locking criteria for an unspent output in the or another transaction.

Provision of the required unlocking criteria to the unspent output in a first transaction may reveal, or make accessible, one or more secret values required to unlock the unspent output in the or another transaction.

An unlocking script containing the secret values may be provided in an input of a subsequent transaction which spends an output in the first or second transaction. Once the unlocking script of the subsequent transaction is executed together with the locking script of the first or second transaction, the subsequent transaction may be validated and subsequently published on a blockchain, which causes the one or more secret values provided in an input of the subsequent transaction to be accessible or readable from the blockchain.

This method provides a secure way of ensuring that secret values are atomically exchanged in a trustless environment, where no user of the method has more control over the method than the other user.

A secret value is related to a corresponding veiled secret value in that the secret value is not feasibly determinable from the veiled secret value, but the veiled secret value is feasibly determinable from the secret value. An example of this relationship is where the application of a one-way function, such as hashing, or modulo arithmetic, to a secret value provides the veiled secret value. Thus, according to one definition, a veiled (secret) value may be one which can be, or has been, derived from an original (secret) value, but which cannot be used to determine the original (secret) value. It may not be feasibly reverse-engineered to provide the original value.

The phrase "unlocking a transaction" may include the meaning of unlocking or spending at least one unspent output (UTXO) provided in the transaction. This may be achieved by providing the required data/unlocking script necessary to satisfy a locking script associated with the unspent output.

At least one of the first transaction and the second transaction may be configured to be redeemable (spendable) only upon the application or provision of a respective first private key and second private key.

This provides the advantage that only an intended recipient, indicated by their private key, is able to unlock a transaction.

The method may further comprise the step of calculating at least one of: (a) a first derived public key based at least in part on a first public key of the first user; and (b) a second derived public key based at least in part of a second public key of the second user, wherein the first derived public key is part of a cryptographic key pair with the first private key and the second derived public key is part of a cryptographic key pair with the second private key.

This enables an asset or resource to be stored at an address that is derived rather than publically known, providing additional privacy and security to a user of the method. It should be noted that the terms "asset" and "resource" may be used interchangeably herein. The term "asset" should not be interpreted solely as having a financial context or use. The asset could, for example, be a token which represents some other entity on or off the blockchain.

The step of calculating at least one of: (a) a first derived public key based at least in part on a first public key of the first user; and (b) a second derived public key based at least in part of a second public key of the second user may further comprise a combination of the first and second veiled secret values.

This provides the advantage of providing a recorded and indelible link between the transactions and the atomic swap being performed.

The combination of the first and second veiled secret values may comprise at least one of a concatenation of the first veiled secret value and the second veiled secret value, and a concatenation of at least one veiled secret value with a random or pseudo-random value.

This provides the advantage of further increasing the security of the transaction via additional deterministic obfuscation.

The method may further comprise the step of constructing at least one of: a third blockchain transaction configured to return control of the first resource to the first user responsive to elapse of a first time period of non-redemption of the first transaction; and a fourth blockchain transaction configured to return control of the second resource to the second user responsive to elapse of a second time period of non-redemption of the second transaction.

This enables at least one user of the method to have control of a respective resource to be returned to them in the event that a further user does not fully participate in the exchange, thereby increasing the versatility of the method.

At least one of the first veiled secret value and the second veiled secret value may comprise a combination of at least one of the first secret value and the second secret value with a shared secret value accessible by both the first user and second user.

This provides the advantage of increasing privacy and security provided by the method. The shared secret value may be established prior to step (i) as a common secret.

This provides the advantage of further increasing the security of the method.

The method may further comprise the following steps:
(iii) generating at least one sequence of veiled secret values starting from at least one of the first secret value and the second secret value;
(iv) executing the method of any preceding claim using at least one of the first secret value and the second secret value;
(v) redeeming at least one blockchain transaction to reveal at least one of the first secret value and the second secret value, thereby causing at least one veiled secret value of the sequence to be revealed.

This enables a chain of secure atomic exchanges to be performed with greater efficiency than a simple repetition of the method, because less storage space is required to store the secrets. Furthermore, fewer rounds of communication are required. This saves time and improves security.

The step of executing at least step (ii) of the method may use at least one veiled secret value revealed in step (v) of the method.

This provides the advantage of further increasing the efficiency of the method.

These and other aspects of the present invention will be apparent from and elucidated with reference to, the embodiments described herein. Embodiments of the present invention will now be described, by way of example only, and not in any limitative sense, with reference to the accompanying drawings, in which.

An atomic transaction exchange on a blockchain means that for two transactions, one from a first user, Alice, to a second user, Bob, and another from Bob to Alice, either both transactions are completed or neither are completed.

Figure 1:
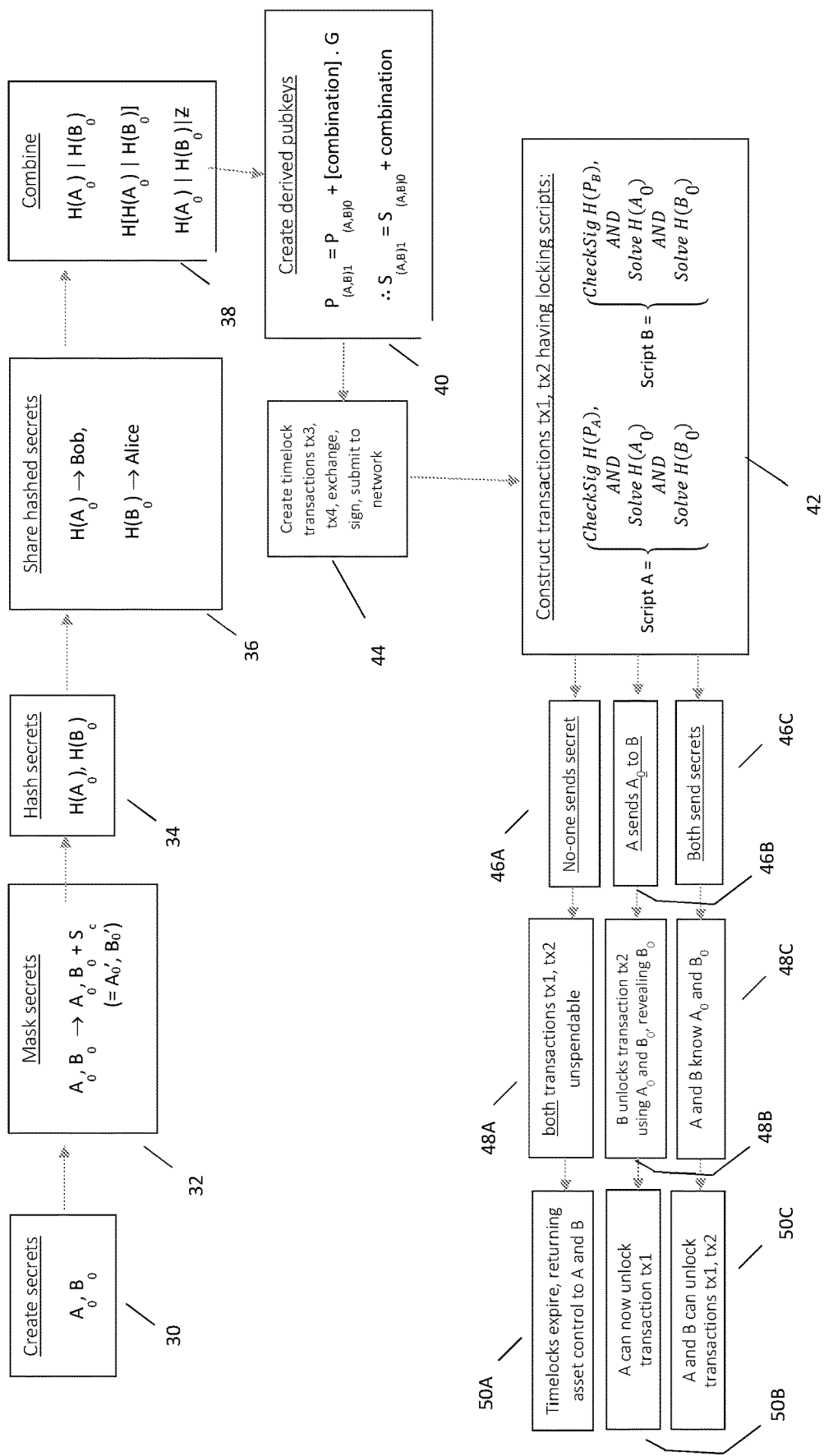
FIG. 1 shows a flowchart illustrating the steps taken in a method embodying the present invention.

With reference to FIG. 1, the present invention involves enabling Alice and Bob to each create secrets, denoted $A_0$ and $B_0$ respectively 30. If Alice and Bob are trustworthy then they can exchange information, including these secrets, using a communication channel which is not be part of the blockchain protocol. The may use a secure secret exchange as described below beneath the subtitle Determination of a common secret.

Suppose that one party is not trustworthy and does not share their secret. The present invention provides that the only way for this party to spend their funds is to reveal their secret on the blockchain, thereby causing the secret to become public knowledge and available to the other user. This is due to the configuration of the transaction used in the exchange. Therefore, the method does not require either party to trust the other.

In an embodiment of the present invention, there are two secrets: one generated by and accessible to Alice and the other generated by and accessible to Bob. These are communicated through an off-blockchain channel.

Single Atomic Swap

Let $P_{A_0}$ denote the elliptic curve digital signature algorithm (ECDSA) public key of Alice with corresponding private key $S_{A_0}$, and let $P_{B_0}$ denote the public key of Bob with private key $S_{B_0}$.

1. At 30, Alice chooses a secret $A_0 \in \mathbb{Z}_n^*$ known only to herself and Bob chooses a secret $B_0 \in \mathbb{Z}_n^*$ known only to himself. (These secrets are not related to the public or private keys of Alice and Bob.) Here, n is the order of the elliptic curve generator point G. The secret may be in the form of a general data structure which has been passed through a SHA256 (mod n) algorithm.

2. Alice and Bob open a communication channel between them. This may be a secure communication channel created using the method described below beneath the subtitle Determination of a common secret. They then hash their respective secrets (step 34) and share their public keys and the hashes of their respective secrets (step 36). The hash values of $A_0$ and $B_0$ are denoted $H(A_0)$ and $H(B_0)$ respectively, where a standard hash function such as SHA-256 may be used. The values $H(A_0)$ and $H(B_0)$ may also be publicly shared. Alice and Bob now both know $$P_{A_0}, P_{B_0}, H(A_0), H(B_0).$$

3. At 38, Alice and Bob calculate the deterministic key $$H(A_0)|H(B_0),$$

where "|" denotes the operation OP_CAT, or, alternatively, a derived hash such as $H(H(A_0)|H(B_0))$.

4. At 40, Alice and Bob now create derived public keys

Alice: $P_{A_1} = P_{A_0} + (H(A_0)|H(B_0)) \cdot G$

Bob: $P_{B_1} = P_{B_0} + (H(A_0)|H(B_0)) \cdot G.$ which have corresponding private keys Alice: $S_{A_1} = S_{A_0} + H(A_0)|H(B_0)$ Bob: $S_{B_1} = S_{B_0} + H(A_0)|H(B_0).$ Alice and Bob will use the derived public keys $P_{A_1}$, $P_{B_1}$ to perform the atomic swap. In principle, they could use their original public keys $P_{A_0}$, $P_{B_0}$, however the derived public keys have the advantage that they are tied to the atomic swap and can easily be calculated by Alice and Bob but not to anyone else (unless $H(A_0)$ and $H(B_0)$ have been made public).

Added privacy may be achieved if, at 38, a deterministic pseudo-random seeming value is also incorporated, such as:

$$H(A_0)|H(B_0)|Z$$

where Z is something both parties can calculate, such as a Zeta function, agreed in advance based on a shared starting value.

5. At 42, Alice and Bob construct the following locking scripts. Here, the scripts are described schematically, with an exemplary implementation in Bitcoin script illustrated later.

LockingScript(A)=CheckSig $H(P_{A_1})$ AND Solve $H(A_0)$ AND Solve $H(B_0)$

LockingScript(B)=CheckSig $H(P_{B_1})$ AND Solve $H(A_0)$ AND Solve $H(B_0)$

The process CheckSig $H(P_{A_1})$ is the standard ECDSA signature validation operation for public/private key pair $P_{A_1}$, $S_{A_1}$. Instead, CheckSig $H(P_{A_0})$ may be used, which is a standard ECDSA signature validation with public/private key pair $P_{A_0}$, $S_{A_0}$. The process Solve $H(A_0)$ is a hash puzzle with solution $A_0$, meaning that the unlocking script must contain a valid value $A_0$ that when hashed is equal to $H(A_0)$ as provided in the locking script. The unlocking scripts are given by UnlockingScript(A)=$[B_0][A_0][Sig\ P_{A_1}][P_{A_1}]$ UnlockingScript(B)=$[B_0][A_0][Sig\ P_{B_1}][P_{B_1}]$ Here it can be seen that if either Alice or Bob unlock their funds they will necessarily expose the values $A_0$ and $B_0$ on the blockchain.

6. At 42, Alice creates a transaction $tx_1$ to $P_{B_1}$ with locking script LockingScript(B) and Bob creates a transaction $tx_2$ to $P_{A_1}$ with locking script LockingScript(A). At this stage neither Alice nor Bob can spend the funds at $P_{A_1}$ and $P_{B_1}$ since neither party knows both $A_0$ and $B_0$. These transactions are sent to the network and subsequently appear on the blockchain.

7. At 46C, Alice sends Bob her secret $A_0$ and Bob sends Alice his secret $B_0$. This is performed using the communication channel between Alice and Bob established above. Alice and Bob may check that these are the correct values by confirming that their hash values are equal to $H(A_0)$ and $H(B_0)$.

8. Assuming Alice and Bob are both honest and share their correct secrets, then both parties know both secrets (step 48C) and both may spend the funds locked in $P_{A_1}$ and $P_{B_1}$ (step 50C), and the atomic swap is complete.

9. Suppose, for example, that Bob does not send his correct secret $B_0$ to Alice. That is, suppose only Alice sends her secret, and step 46B occurs rather than 46C. Due to the form of the locking script LockingScript(B), in order for Bob to spend the funds locked $P_{B_1}$ he must publicly expose his secret $B_0$ in the unlocking script. As a result, as soon as Bob spends his funds, Alice learns Bob's secret (step 48B) and therefore becomes able to spend her funds in $P_{A_1}$ (step 50B). This ensures that either both Alice and Bob can spend their funds or neither can spend their funds.

Below are exemplary locking and unlocking scripts for Alice in step 4 above, compatible with the Bitcoin blockchain.

Locking script for Alice:
OP_DUP OP_HASH160 <Hash160 $P_{A_1}$> OP_EQUALVERIFY OP_CHECKSIG OP_HASH256 <Hash256 $A_0$> OP_EQUALVERIFY OP_HASH256 <Hash256 $B_0$> OP_EQUALVERIFY Unlocking script for Alice:
<$B_0$> <$A_0$> <Sig $P_{A_1}$> <$P_{A_1}$>

Note that transactions to Pay To Public Key Hash (P2PKH) addresses and Pay To Script Hash (P2SH) addresses both allow for locking and unlocking scripts of the above type. For P2SH addresses, the locking script is presented as the hash of a redeem script containing the same information.

The method above is described with reference to a blockchain that uses a public/private key encryption system similar to the ECSDA used on the Bitcoin blockchain. However, the method can be generalised to a general encryption mechanism that requires a general form of a secret (which may be an arbitrary data structure) to be exposed in an unlocking script. Required are a locking script, transaction and a blockchain, which is a secure, verifiable communication channel.

Time-Lock Refund Transactions

If Bob refuses to give Alice his correct secret $B_0$ and also does not unlock his funds stored in address $P_{B_1}$ then Bob's secret will not be revealed to Alice and she can never unlock her funds stored in $P_{A_1}$. Moreover, Alice can also never reclaim the funds she sent to Bob that are stored in $P_{B_1}$.

This problem can be solved by introducing a new transaction from Bob to Alice that is configured send the funds back after a certain amount of time if they are not spent. This also requires slightly modifying LockingScript(A) and LockingScript(B), which modification is described below.

This new transaction makes use of a time-dependent operation in the locking scripts that allows a transaction to be accepted by a block only after a certain pre-specified time has passed. For example, in Bitcoin script, this may be the operation Check Sequence Verify (CSV) for a relative amount of time since a specified value or Check Lock Time Verify (CLTV) for a fixed time value.

The locking scripts in step 4 above are modified to include the option of spending if both Alice and Bob agree to sign, as follows:

LockingScript′(A) =
$$\begin{cases} \text{CheckSig}\,H(P_{A_1}) \text{ AND Solve } H(A_0) \text{ AND Solve } H(B_0) \\ \text{OR} \\ \text{CheckSig}\,H(P_{A_1}) \text{ AND CheckSig}H(P_{B_1}) \end{cases}$$

LockingScript′(B) =
$$\begin{cases} \text{CheckSig}\,H(P_{B_1}) \text{ AND Solve } H(A_0) \text{ AND Solve } H(B_0) \\ \text{OR} \\ \text{CheckSig}\,H(P_{A_1}) \text{ AND CheckSig}\,H(P_{B_1}) \end{cases}$$

At 44, two new transactions are then created after step 4 and before step 5 in the method described above. Alice creates a transaction $tx_4$ from $P_{A_1}$ to Bob that returns all of his funds. This transaction is time-locked such that it can only be accepted in a block after a certain amount of time, for example 24 hours. Bob creates a similar transaction $tx_3$ from $P_{B_1}$ to Alice. The transactions $tx_3$ and $tx_4$ have respective locking scripts LockingScript2(A)=CheckSig $H(P_{A_1})$AND $CSV$(24 hours)

LockingScript2(B)=CheckSig $H(P_{B_1})$AND $CSV$(24 hours)

Alice signs $tx_4$ and sends it to Bob who signs and sends it to the network. Similarly, Bob signs $tx_3$ and sends it to Alice who signs and sends to the network.

At this stage, if neither party is compliant, the process is abandoned and no funds are transferred. If both parties are compliant, step 5 of the above method is performed (42). Now, if neither party spends the funds exchanged in the atomic swaps (46A), the funds will be returned to the original owners after 24 hours (48A, 50A).

Note that here a CSV relative time of 24 hours has been used as an example, but it would be possible to use any relative time in the future or any specific time in the future (using a CLTV operator, for example).

An example of a locking script of $tx_3$ that returns funds to Alice after 24 hours using the Bitcoin blockchain is "24 h" OP_CHECKSEQUENCEVERIFY OP_DROP OP_DUO OP_HASH160 <Hash160 $P_{A_1}$> OP_EQUALVERIFY OP_CHECKSIG The corresponding unlocking script is given by $<\text{Sig } P_{A_1}><_{A_1}>$.

Masking of the Secret Values

A further, alternative embodiment includes masking steps 32 so that the values $A_0$ and $B_0$ are known only to Alice and Bob and never made public.

In the beginning Alice and Bob both agree on a shared secret S, that only they know. This can be achieved through the secure exchange of a secret using the method described below, titled Determination of a common secret.

Alice and Bob then Define the New Secrets $$A'_0 = A_0 + S_c$$

$$B'_0 = B_0 + S_c.$$

They then proceed as in the method outlined above but with the masked secrets $A'_0$, $B'_0$ instead of the original secrets. During the atomic swap, only the masked secrets are revealed to the public on the blockchain.

This is useful if the secret values $A_0$ and $B_0$ are to be also used in other contexts, such as in further embodiments described below.

A further, alternative embodiment enables Alice and Bob to make a series of n atomic swaps. Each party starts with a random secret and create a sequence of hash values of this secret, which is called an access chain. When an atomic swap is performed it exposes the hash value of the next secret to be used in the next atomic swap. This process is repeated iterably up to a maximum of n times.

There are efficiency savings for this method over a series of individual swaps, in that less storage space is required for the secrets as Alice and Bob only need to store one secret at a time. They can calculate the next secret from hashing the previous secret. They need fewer rounds of communication between each other as they do not need to communicate the hash of their secret each time. This saves time and improves security.

The method is as follows:

Alice and Bob agree on a number n of repeat exchanges. They create a random value $A_n$ and $B_n$ respectively. Alice calculates the following access chain:

$$A_n = \text{random}$$

$$A_{n-1} = \text{hash}(A_n)$$

$$A_{n-2} = \text{hash}(A_{n-1})$$

$$\vdots$$

$$A_{i-1} = \text{hash}(A_i)$$

$$\vdots$$

$$A_0 = \text{hash}(A_1)$$

Bob calculates an equivalent chain starting from $B_n$. These chains correspond to secret values that will be used in a series of swaps. The number of possible swaps will be in the sequence $\{0, 1, \ldots, n\}$. That is, the parties can use these values for the swap of between 0 and n transactions before needing to re-initialize a new chain.

The method for implementing the swaps is outlined below. It should be understood that Bob follows an equivalent process.

1. Alice starts with her chain $A_0, A_1, \ldots, A_n$, Bob's public key $P_{B_0}$, and the hash of Bob's secret $H(B_0)$. As before, $H(B_0)$ may be publically shared by Bob.

2. Alice calculates the derived public keys $$\text{Alice:} P_{A_1} = P_{A_0} + (H(A_0)|H(B_0)) \cdot G$$

$$\text{Bob:} P_{B_1} = P_{B_0} + (H(A_0)|H(B_0)) \cdot G,$$

and then the locking scripts $$\text{LockingScript}(A)_0 = \text{CheckSig } H(P_{A_1}) \text{ AND Solve } H(A_0) \text{ Solve } H(B_0)$$

$$\text{LockingScript}(B)_0 = \text{CheckSig } H(P_{B_1}) \text{ AND Solve } H(A_0) \text{ Solve } H(B_0).$$

Note that the time dependent refund described in an earlier embodiment could be included in the above locking scripts without any substantive change to the logic.

3. Alice and Bob perform the first swap. As described above, this involves the exchange of $A_0$ and $B_0$ between Alice and Bob. This means that after the swap Alice now knows $H(B_1) = B_0$.

4. Alice repeats step 2 of the method, but with the hash of Bob's second secret in the chain $H(B_1)$. Explicitly, she calculates the derived public keys $$\text{Alice:} P_{A_2} = P_{A_1} + (H(A_1)|H(B_1)) \cdot G$$

$$\text{Bob:} P_{B_2} = P_{B_1} + (H(A_1)|H(B_1)) \cdot G,$$

and the locking scripts $$\text{LockingScript}(A)_1 = \text{CheckSig } H(P_{A_2}) \text{ AND Solve } H(A_0) \text{ Solve } H(B_1)$$

$$\text{LockingScript}(B)_1 = \text{CheckSig } H(P_{B_2}) \text{ AND Solve } H(A_1) \text{ Solve } H(B_1).$$

5. Once the second swap has been completed Alice knows $H(B_2) = B_1$. She repeats step 2 again with the hash of Bob's third secret $H(B_2)$.

6. This process is repeated iterably until either a swap is not completed or the maximum number of n swaps has been reached.

As described in an earlier embodiment, further security may be incorporated by introducing a pseudo-random value $Z_i$ to the operation $H(A_i)|H(B_i)|Z_i$. In this case the function should transform every iteration for example by using a hash function $Z_{i-1} = H(Z_i)$.

The atomic swap method outlined above is not restricted to the Bitcoin blockchain. An important component in the atomic swap method described above is that when one party spends their funds in step 7 they reveal their secret on the blockchain. This means that the above method may be used to perform an atomic swap on any blockchain that allows for locking and unlocking scripts of the form given in step 4.

Furthermore, the atomic swap method may be used to exchange cryptocurrencies. For example, it may be used for Alice to send Bitcoin to Bob on the Bitcoin blockchain and Bob to send Ethereum to Alice on the Ethereum blockchain.

|       | Sends | Receives |
|-------|-------|----------|
| Alice | BCH   | Eth      |
| Bob   | Eth   | BCH      |

The only restriction on an atomic swap between two different blockchains is that they allow for the same hash function to be used in the hash puzzle in the locking scripts (or equivalent). The reason for this is as follows: suppose Alice's blockchain only allows for the use of an SHA-256 hashing algorithm and Bob's blockchain only allows for an SHA-384 algorithm. Bob sends Alice the SHA-256 hash of one secret, but in his locking script he sets a SHA-384 hash puzzle for a different secret. When he spends his funds the unlocking script will reveal a secret that is of no use to Alice, and Alice has no way of knowing this until Bob has already spent his funds.

According to a further embodiment, a method is provided which enables two parties to each create a public key for which the corresponding private keys are only made accessible either to both parties or neither party. The method makes use of the atomic swap method described above in order to exchange two secret values between both parties. These secret values are used to compute the private keys.

One application of this method is that it allows for two parties to exchange multiple types of cryptocurrencies that are controlled by a single public/private key pair.

This method enables Alice and Bob to each create a public key for which the private key is not known until an atomic swap has taken place. The atomic swap ensures that either both Alice and Bob can calculate their corresponding private keys or neither can calculate their private keys.

The method is described below using ECSDA private and public key pairs, as used for example in Bitcoin, Ethereum and Dash. However, the method is not critically dependent on the ECDSA protocol and can be easily adapted to any public/private key based cryptography system, for which a new secure public key can be deterministically created from an existing private key and a publically known deterministic key.

The method is pseudonymous in the sense that partial information about the new private keys is stored on one or more blockchains, which are open ledgers. However, only the parties involved in the process are able to decode this information and thus security is never compromised.

1. Alice begins with a private key $S_A$ with corresponding public key $P_A=S_A \cdot G$ and a secret $S_2$ that only she knows. Bob begins with a private key $S_B$ with corresponding public key $P_B=S_B \cdot G$ and a secret $S_1$ that only he knows.
2. Alice sends Bob $P_2=S_2 \cdot G$ and Bob sends Alice $P_1=S_1 \cdot G$. Since the secrets are multiplied by the elliptic curve base point they are not exposed in this process, and $P_2$ and $P_1$ may be publically known.
3. Alice creates a new public key $P_{AE}=P_A+P_1$ which may be used as an address in which to receive a bitcoin transaction (or similar for alt-coins). Bob creates the new public key $P_{BE}=P_B+P_2$.
   In accordance with the properties of elliptic curve cryptography, the corresponding private key to $P_{AE}$ is $S_{AE}=S_A+S_1$, meaning that $P_{AE}=S_{AE} \cdot G$. The corresponding private key to $P_{BE}$ is $S_{BE}=S_B+S_2$.
   At this stage, Alice does not know $S_1$, and therefore does not know the private key for $P_{AE}$. Although Bob knows $S_1$, he does not know $S_A$, and therefore also does not know the private key for $P_{AE}$. By the same logic, neither Alice nor Bob knows the private key for $P_{BE}$.
4. Alice makes a transaction to Bob's address $P_{BE}$ and Bob makes a transaction to Alice's address $P_{AE}$. These transactions may be the exchange of any cryptocurrency that uses a public/private key system, or they may transfer tokens or even physical assets to the ownership of the public keys $P_{AE}$ and $P_{BE}$. It may also be a combination of the above.
5. Alice and Bob now initialise an atomic swap, as described above, using any blockchain, with $S_2$ and $S_1$ as their respective secrets.
6. Alice and Bob exchange secrets. This means that:

|  | Sends | Receives |
| --- | --- | --- |
| Alice | $S_2$ | $S_1$ |
| Bob | $S_1$ | $S_2$ |

Alice and Bob may check that they have received the correct secrets using the formulae $P_1=S_1 \cdot G$ and $P_2=S_2 \cdot G$. If they do not exchange the correct values, then they cannot spend the outputs of the atomic swap.
7. Now Alice is in possession of $S_1$ she can calculate the private key corresponding to $P_{AE}$. Since no one other than Alice knows her private key $S_A$, no one else can calculate the private key corresponding to $P_{AE}$ even if $S_1$ is publically known. Similarly, now that Bob is in possession of the secret $S_2$, he may calculate the private key corresponding to $P_{BE}$, and no one other than Bob can do this.
   If neither Alice nor Bob spends their transaction output of the atomic swap, Alice's secret $S_2$ is not exposed to Bob, and Bob's secret $S_1$ is not exposed to Alice. In this case, neither Alice nor Bob is able to calculate the private keys corresponding to $P_{AE}$ and $P_{BE}$.

Blockchains use public/private key encryption system to sign transactions and prove ownership of transaction outputs. This enables use of the method of the embodiment above to send transactions to $P_{AE}$ and $P_{BE}$ in several cryptocurrencies simultaneously. For example, after establishing $P_{AE}$ and $P_{BE}$ in step 3 above:

Alice moves funds in BCH and ETH to $P_{BE}$.
Bob moves funds in BCH and DASH to $P_{AE}$.

Once the atomic swap has been performed, the private keys to $P_{BE}$ and $P_{AE}$ are unlocked. These unlock the funds in the Bitcoin and Ethereum public key held by Alice, and the Bitcoin and Dash public key held by Bob. Hence, the following transactions from Alice to Bob can be completed securely

|  | Sends | Receives |
| --- | --- | --- |
| Alice | BCH, Eth | BCH, DASH |
| Bob | BCH, DASH | BCH, Eth |

Note that these blockchains do not have to allow for the same hash functions in their locking scripts.

Provided above are general methods for two parties to unlock public keys through the exchange of secrets using an atomic swap. This has applications beyond the exchange of cryptocurrencies, and is relevant to any system using a public/private key cryptography scheme similar to that of ECDSA. For example, other use cases include, but are not limited to:

1. Providing access to a Distributed Hash Table (DHT);
2. Encrypted calculations;
3. Private email clients;
4. Access to logistics data and exchanges;
5. Swaps of goods and services;
6. Private exchange of value; and
7. Hierarchy of keys.

Determination of a Common Secret

Where appropriate, security may be increased by using a secure method of the exchange of information between two parties using a public/private key system such as that described below.

A common secret (CS) can be established between two parties and then used to generate a secure encryption key for transmission of one or more of the shares. The Common Secret (CS) is generated and used to enable secure exchange of any Secret ($S_{A,B,1,2}$) e.g. secret value, key or share thereof.

Hereafter, for the sake of convenience, Alice and Bob will be referred to as a first node (C) a second node (S). The aim is to generate a common (CS) secret which both nodes know but without that common secret having been sent via a communication channel, thus eliminating the possibility of its unauthorised discovery The secure transmission technique involves the CS being generated at each end of the transmission in an independent manner, so that while both nodes know the CS it has not had to travel over potentially unsecure communication channels. Once that CS has been established at both ends, it can be used to generate a secure encryption key that both nodes can use for communication thereafter.

Figure 2:
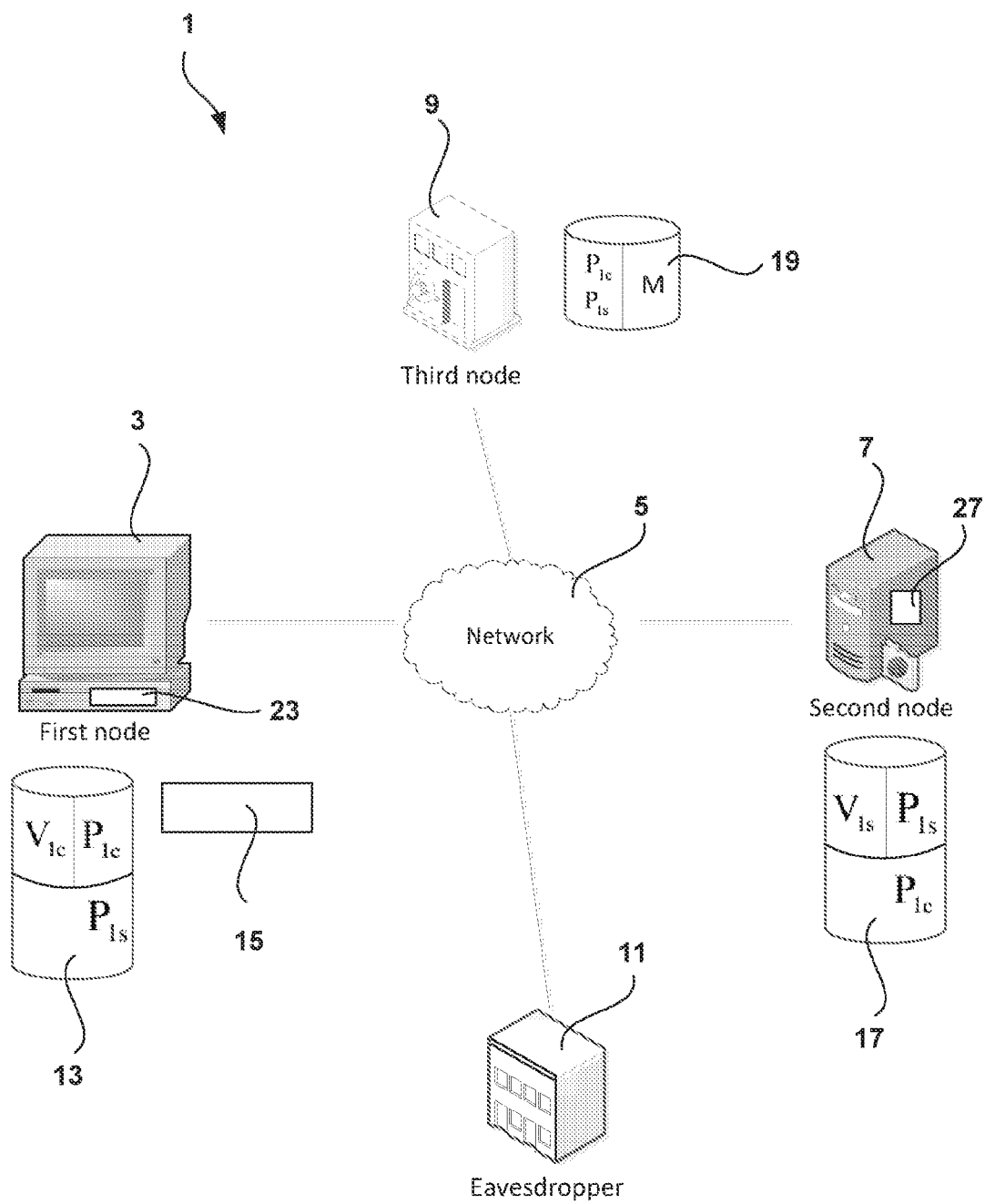
FIG. 2 is a schematic diagram of an example system to determine a common secret for a first node and second node, as may be used in accordance with the present invention for secure transmission of highly sensitive information.
Figure 3:
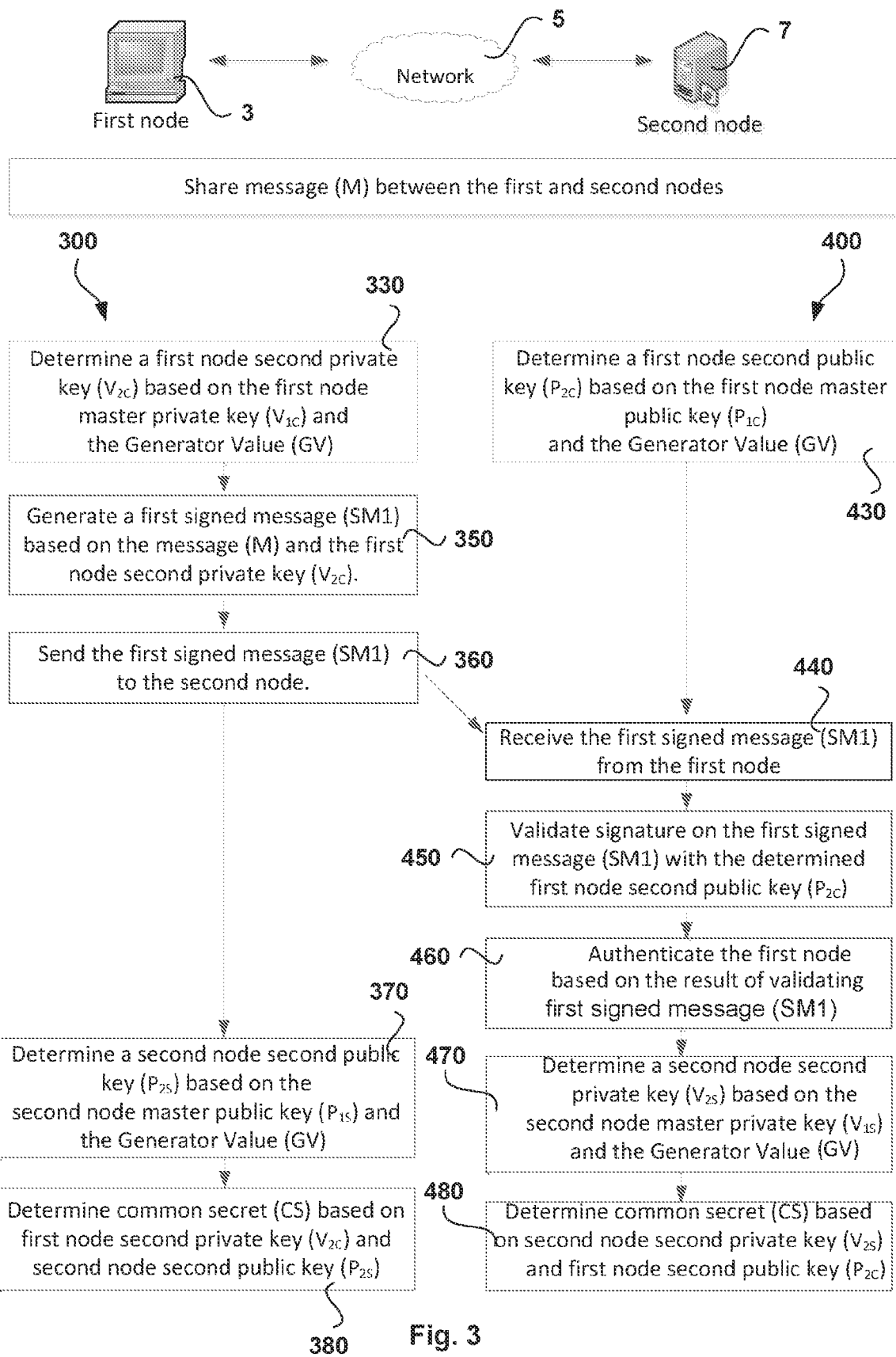
FIG. 3 is a flow chart of computer-implemented methods for determining a common secret as may be used in accordance with the present invention for secure transmission of highly sensitive information.

FIG. 2 illustrates a system 1 that includes a first node 3 which is in communication with a second node 7 over a communications network 5. The first node 3 has an associated first processing device 23 and the second node 5 has an associated second processing device 27. The first and second nodes 3, 7 may include an electronic device, such as a computer, phone, tablet computer, mobile communication device, computer server etc. In one example, the first node 3 may be a client (user) device and the second node 7 may be a server. The server may be a digital wallet provider's server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet. The public key for each node may be shared publicly, such as over communications network 5.

To determine the common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

The same common secret (CS) can also be determined at the second node 7 by method 400. The method 400 includes determining 430 a first node second public key ($P_{2C}$) based on the first node master public key ($P_{1C}$) and the Generator Value (GV). The method 400 further includes determining 470 a second node second private key ($V_{2S}$) based on the second node master private key ($V_{1S}$) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key) for encrypted communication between the first and second nodes 3, 7 over the communications network 5.

The methods 300, 400 may include additional steps. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM2) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In yet another example, the message may be generated at a third node 9 and the message sent to both the first and second nodes 3, 7. In yet another alternative, a user may enter the message through a user interface 15 to be received by the first and second nodes 3, 7. In yet another example, the message (M) may be retrieved from a data store 19 and sent to the first and second nodes 3, 7. In some examples, the message (M) may be public and therefore may be transmitted over an unsecure network 5.

In further examples, one or more messages (M) may be stored in a data store 13, 17, 19, where the message may be associated with some entity such as digital wallet, or a communication session established between the first node 3 and the second node 7. Thus the messages (M) may be retrieved and used to recreate, at the respective first and second nodes 3, 7, the common secret (CS) associated with that wallet or session.

Advantageously, a record to allow recreation of the common secret (CS) may be kept without the record by itself having to be stored privately or transmitted securely. This may be advantageous if numerous transactions are performed at the first and second nodes 3, 7 and it would be impractical to store all the messages (M) at the nodes themselves.

Figure 4:
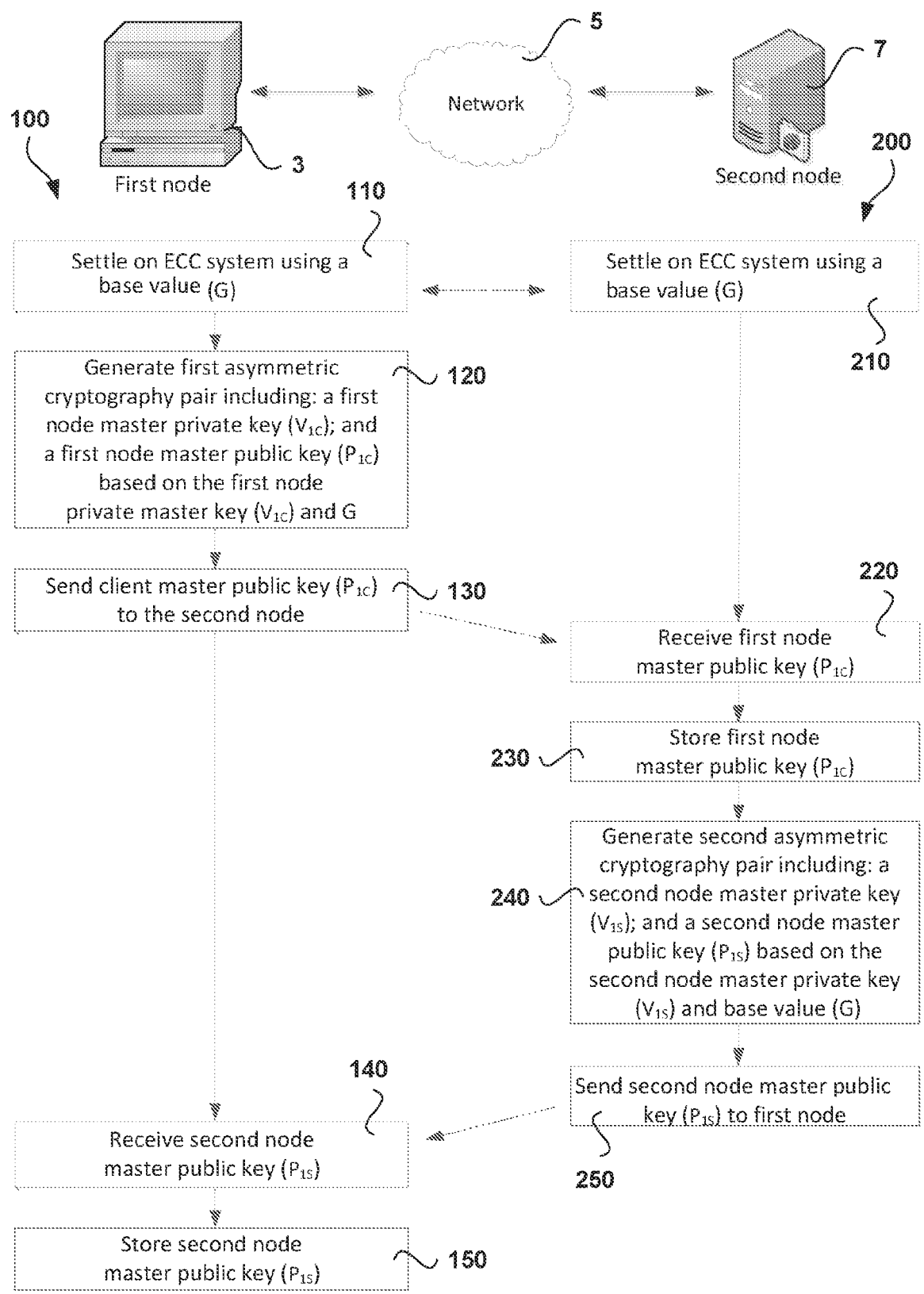
FIG. 4 is a flow chart of computer-implemented methods to register the first and second nodes.

An example of a method of registration 100, 200 will be described with reference to FIG. 4, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

Standards for ECC may include known standards such as those described by the Standards for Efficient Cryptography Group (www.sceg.org). Elliptic curve cryptography is also described in U.S. Pat. Nos. 5,600,725, 5,761,305, 5,889,865, 5,896,455, 5,933,504, 6,122,736, 6,141,420, 6,618,483, 6,704,870, 6,785,813, 6,078,667, 6,792,530.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment of using the common ECC system and base point (G).

The method 100 also includes the first node 3 generating 120 a first asymmetric cryptography pair that includes the first node master private key ($V_{1C}$) and the first node master public key ($P_{1C}$). This includes generating the first master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C} = V_{1C} \times G \quad \text{(Equation 1).}$$

Thus the first asymmetric cryptography pair includes:
$V_{1C}$: The first node master private key that is kept secret by the first node.
$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

The method 100 further includes sending 130 the first node master public key ($P_{1C}$), over the communications network 5, to the second node 7. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key ($V_{1S}$) and the second node master public key ($P_{1S}$). The second node master private key ($V_{1S}$) is also a random integer within the allowable range. In turn, the second node master public key ($P_{1S}$) is determined by the following formula:

$$P_{1S} = V_{1S} \times G \quad \text{(Equation 2).}$$

Thus the second asymmetric cryptography pair includes:
$V_{1S}$: The second node master private key that is kept secret by the second node.
$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus, in some examples, the first node master public key ($P_{1C}$) may be requested and received by the second node 7 only when determining the common secret (CS) is required (and vice versa).

The registration steps may only need to occur once as an initial setup of, for example, the digital wallet.

Figure 5:
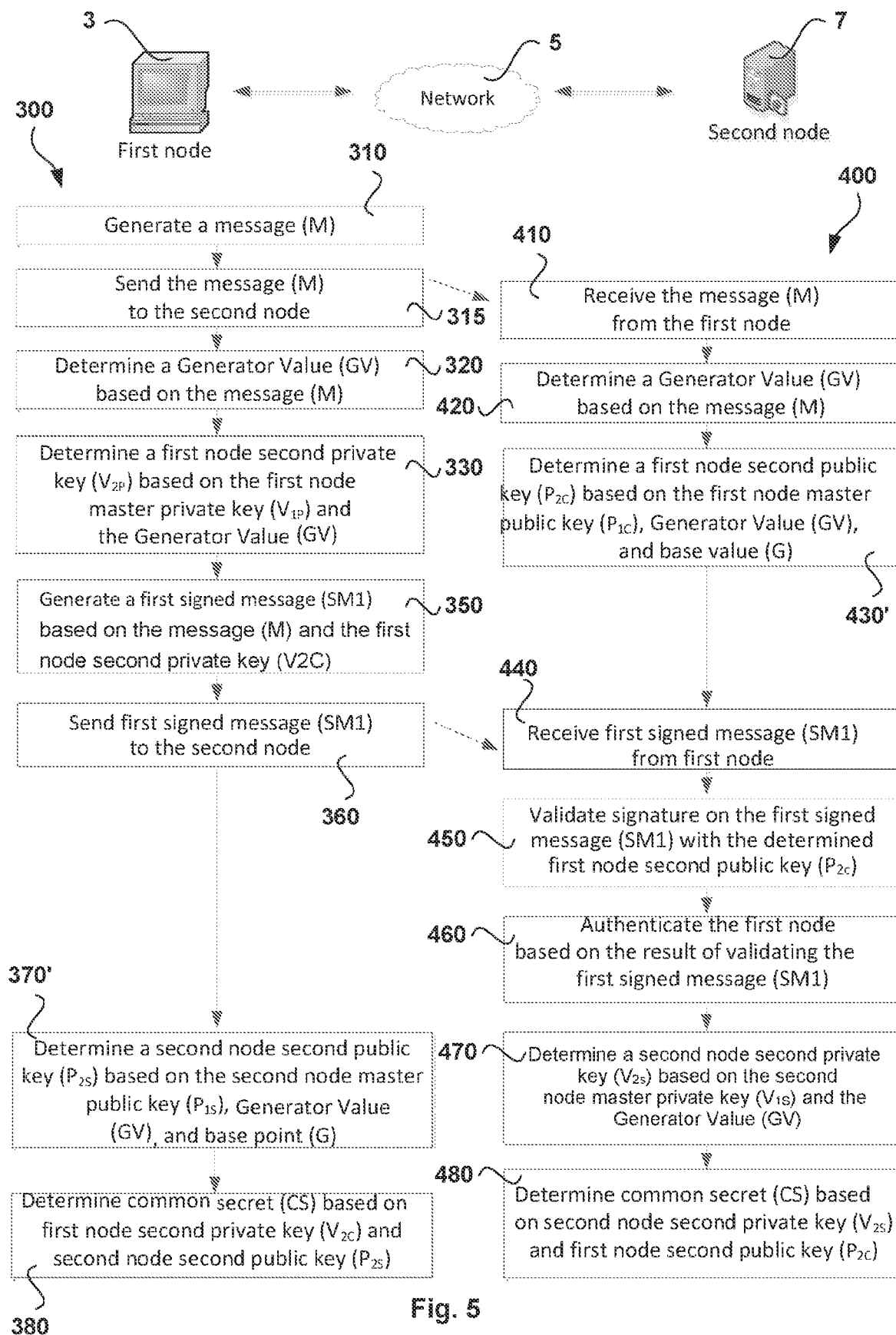
FIG. 5 is another flow chart of computer-implemented methods for determining a common secret as may be used in accordance with the present invention for secure transmission of highly sensitive information.

An example of determining a common secret (CS) will now be described with reference to FIG. 5. The common secret (CS) may be used for a particular session, time, transaction, or other purpose between the first node 3 and the second node 7 and it may not be desirable, or secure, to use the same common secret (CS). Thus, the common secret (CS) may be changed between different sessions, time, transactions, etc.

The following is provided for illustration of the secure transmission technique which has been described above.

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message}(M) = \text{UnixTime} + \text{nonce} \quad \text{(Equation 3).}$$

In some examples, the message (M) is arbitrary. However, it is to be appreciated that the message (M) may have selective values (such as Unix Time, etc) that may be useful in some applications.

The method 300 includes sending 315 the message (M), over the communications network 3, to the second node 7.

The message (M) may be sent over an unsecure network as the message (M) does not include information on the private keys.

The method 300 further includes the step of determining 320 a Generator Value (GV) based on the message (M). In this example, this includes determining a cryptographic hash of the message. A$_n$ example of a cryptographic hash algorithm includes SHA-256 to create a 256-bit Generator Value (GV). That is:

$$GV = SHA\text{-}256(M) \quad \text{(Equation 4)}.$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C} = V_{1C} + GV \quad \text{(Equation 5)}.$$

Thus, the first node second private key ($V_{2C}$) is not a random value but is instead deterministically derived from the first node master private key. The corresponding public key in the cryptographic pair, namely the first node second public key ($P_{2C}$), has the following relationship:

$$P_{2C} = V_{2C} \times G \quad \text{(Equation 6)}.$$

Substitution of $V_{2C}$ from Equation 5 into Equation 6 provides:

$$P_{2C} = (V_{1C} + GV) \times G \quad \text{(Equation 7)}$$

where the '+' operator refers to elliptic curve point addition. Noting that elliptic curve cryptography algebra is distributive, Equation 7 may be expressed as:

$$P_{2C} = V_{1C} \times G + GV \times G \quad \text{(Equation 8)}.$$

Finally, Equation 1 may be substituted into Equation 7 to provide:

$$P_{2C} = P_{1C} + GV \times G \quad \text{(Equation 9.1)}$$

$$P_{2C} = P_{1C} + SHA\text{-}256(M) \times G \quad \text{(Equation 9.2)}.$$

Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1).

Examples of ECDSA include those based on ECC systems with secp256kl, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S} = V_{2S} \times G \quad \text{(Equation 10.1)}$$

$$P_{2S} = P_{1S} + GV \times G \quad \text{(Equation 10.2)}.$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S = V_{2C} \times P_{2S} \quad \text{(Equation 11)}.$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C} = V_{2C} \times G \quad \text{(Equation 12.1)}$$

$$P_{2C} = P_{1C} + GV \times G \quad \text{(Equation 12.2)}.$$

The mathematical proof for Equations 12.1 and 12.2 is the same as those discussed above for Equations 10.1 and 10.2.

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The above authentication may be suitable for scenarios where one of the two nodes is a trusted node and only one of the nodes need to be authenticated. For example, the first node 3 may be a client and the second node 7 may be a server trusted by the client such as a wallet provider. Thus, the server (second node 7) may need to authenticate the credentials of the client (first node 3) in order to allow the client access to the server system. It may not be necessary for the server to be authenticate the credentials of the server to the client. However, in some scenarios, it may be desirable for both nodes to be authenticated to each other, such as in a peer-to-peer scenario.

The method 400 may further include the second node 7 determining 470 a second node second private key ($V_{2S}$) based on the second node master private key ($V_{1S}$) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S} = V_{1S} + GV \qquad \text{(Equation 13.1)}$$

$$V_{2S} = V_{1S} + SHA\text{-}256(M) \qquad \text{(Equation 13.2)}.$$

The second node 7 may then, independent of the first node 3, determine 480 the common secret (CS) based on the second node second private key ($V_{2S}$) and the first node second public key ($P_{2C}$) based on the following formula:

$$S = V_{2S} \times P_{2C} \qquad \text{(Equation 14)}.$$

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S = V_{2C} \times P_{2S}$$

$$S = V_{2C} \times (V_{2S} \times G) \qquad \text{(Equation 11)}$$

$$S = (V_{2C} \times V_{2S}) \times G \qquad \text{(Equation 15)}.$$

Turning to the common secret (CS) determined by the second node 7, Equation 12.1 can be substituted into Equation 14 as follows:

$$S = V_{2S} \times P_{2C}$$

$$S = V_{2S} \times (V_{2C} \times G) \qquad \text{(Equation 14)}$$

$$S = (V_{2S} \times V_{2C}) \times G \qquad \text{(Equation 16)}.$$

Since ECC algebra is commutative, Equation 15 and Equation 16 are equivalent, since:

$$S = (V_{2C} \times V_{2S}) \times G = (V_{2S} \times V_{2C}) \times G \qquad \text{(Equation 17)}$$

The common secret (CS) may now be used as a secret key, or as the basis of a secret key in a symmetric-key algorithm for secure communication between the first node 3 and second node 7. This communication may be used to convey part of a private key, a representation of or identifier for a private key, or mnemonic for a private key. Therefore, once the invention has been used during set-up of, for example, a digital wallet or other controlled resource, secure communication between the parties can be performed thereafter.

The common secret (CS) may be in the form of an elliptic curve point ($x_S$, $y_S$). This may be converted into a standard key format using standard publicly known operations agreed by the nodes 3, 7. For example, the $x_S$ value may be a 256-bit integer that could be used as a key for $AES_{256}$ encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However, depending on some application, the common secret (CS) could be stored in the first data store (X) associated with the first node provided the common secret (CS) is kept as secure as the first node master private key ($V_{1C}$).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented exchange method, the method comprising the steps of:
   (i) communicating a first veiled secret value from a first user to a second user, wherein the first veiled secret value is based on a first secret value known to the first user and not known to the second user;

(ii) receiving, by the first user, a second veiled secret value from the second user wherein the second veiled secret value is based on a second secret value known to the second user and not known to the first user; and (iii) constructing a first blockchain transaction comprising the first veiled secret value and the second veiled secret value, the first blockchain transaction arranged to be unlockable to transfer control of a first resource upon provision of both the first secret value and the second secret value to the first blockchain transaction, wherein unlocking of the first blockchain transaction causes the first secret value to be revealed to the second user, and unlocking of a second blockchain transaction causes the second secret value to be revealed to the first user, wherein the second blockchain transaction comprises the first veiled secret value and the second veiled secret value and is arranged to be unlockable to transfer control of a second resource upon provision of both the first secret value and the second secret value to the second blockchain transaction.

2. The method according to claim 1, wherein at least one of the first blockchain transaction and the second blockchain transaction is configured to be redeemable only upon application of a respective first private key and second private key.

3. The method according to claim 2, further comprising the step of calculating at least one of: (a) a first derived public key based at least in part on a first public key of the first user; and (b) a second derived public key based at least in part of a second public key of the second user, wherein the first derived public key is part of a cryptographic key pair with the first private key and the second derived public key is part of a cryptographic key pair with the second private key.

4. The method according to claim 3, wherein the step of calculating at least one of: (a) a first derived public key based at least in part on a first public key of the first user; and (b) a second derived public key based at least in part of a second public key of the second user further comprises a combination of the first and second veiled secret values.

5. The method according to claim 4, wherein the combination of the first and second veiled secret values comprises at least one of a concatenation of the first veiled secret value and the second veiled secret value, and a concatenation of at least one veiled secret value with a random or pseudo-random value.

6. The method according to claim 1, further comprising the step of constructing at least one of: a third blockchain transaction configured to return control of the first resource to the first user responsive to elapse of a first time period of non-redemption of the first blockchain transaction; and a fourth blockchain transaction configured to return control of the second resource to the second user responsive to elapse of a second time period of non-redemption of the second blockchain transaction.

7. The method according to claim 1, wherein at least one of the first veiled secret value and the second veiled secret value comprises a combination of at least one of the first secret value and the second secret value with a shared secret value accessible by both the first user and the second user.

8. The method according to claim 7, wherein the shared secret value is established prior to step (i) as a common secret (CS).

9. The method according to claim 1, further comprising the following steps:
(iv) generating at least one sequence of veiled secret values starting from at least one of the first secret value and the second secret value;
(v) executing the method of any preceding claim using at least one of the first secret value and the second secret value; and
(vi) redeeming at least one blockchain transaction to reveal at least one of the first secret value and the second secret value, thereby causing at least one veiled secret value of a sequence to be revealed.

10. The method according to claim 9, wherein constructing the first and second blockchain transactions uses at least one veiled secret value revealed in step (vi).

11. A system, comprising:
one or more processors; and
memory storing instructions executable by the one or more processors to cause the system to perform the method of claim 1.

12. The system, comprising:
one or more processors; and
memory storing instructions executable by the one or more processors to cause the system to perform the method of claim 2.

13. The system, comprising:
one or more processors; and
memory storing instructions executable by the one or more processors to cause the system to perform the method of claim 6.

14. The system, comprising:
one or more processors; and
memory storing instructions executable by the one or more processors to cause the system to perform the method of claim 7.

15. The system, comprising:
one or more processors; and
memory storing instructions executable by the one or more processors to cause the system to perform the method of claim 9.

16. A non-transitory computer-readable storage medium having stored thereon instructions executable by one or more processors of a computer system to perform the method of claim 1.

17. The non-transitory computer-readable storage medium having stored thereon instructions executable by one or more processors of a computer system to perform the method of claim 2.

18. The non-transitory computer-readable storage medium having stored thereon instructions executable by one or more processors of a computer system to perform the method of claim 6.

19. The non-transitory computer-readable storage medium having stored thereon instructions executable by one or more processors of a computer system to perform the method of claim 7.

20. The non-transitory computer-readable storage medium having stored thereon instructions executable by one or more processors of a computer system to perform the method of claim 9.

* * * * *